United States Patent [19]

Miyabayashi

[11] Patent Number: 4,725,661
[45] Date of Patent: Feb. 16, 1988

[54] ONE-CAN THERMOSETTING RESIN COMPOSITIONS

[75] Inventor: Shigeaki Miyabayashi, Kobe, Japan

[73] Assignee: Takeda Chemical Industries, Ltd., Osaka, Japan

[21] Appl. No.: 35,940

[22] Filed: Apr. 8, 1987

[30] Foreign Application Priority Data

Apr. 8, 1986 [JP] Japan ................................. 61-80328

[51] Int. Cl.$^4$ ............................................. C08G 18/80
[52] U.S. Cl. .................................. 528/45; 427/388.1; 427/388.2; 428/425.8
[58] Field of Search ............ 528/45; 427/388.2, 388.1; 428/425.8

[56] References Cited

U.S. PATENT DOCUMENTS 4,562,714  1/1986  Tanaka et al. ...................... 427/358

*Primary Examiner*—Maurice J. Welsh
*Attorney, Agent, or Firm*—Wenderoth, Lind & Ponack

[57] ABSTRACT

A one-can thermosetting resin composition comprising (a) a polyester polyol which is obtainable by allowing dicarboxylic acid to react with glycol and polyol having at least three OH groups, either one of the dicarboxylic acid and the glycol being an aliphatic one and the other being a cyclic one, whose hydroxyl value is 20–300, and (b) a blocked a,a,a',a'-tetramethyl-xylene diisocyanate or/and 4,4'-methylene bis(cyclohexyl isocyanate) or a blocked NCO-terminated prepolymer which is obtained by allowing α,α,α',α'-tetramethylxylene diisocyanate or/and 4,4'-methylenebis(cyclohexyl isocyanate) to react with an active hydrogen compound, give excellent coating films in yellowing and thermal degradation, and also in increased hardness as well as a high flexibility, stain resistance and chemical resistance. When the composition is used for preparing precoated metals, it gives good steel plates, thus being advantageously utilized for, among others, light electrical appliances.

8 Claims, No Drawings

ONE-CAN THERMOSETTING RESIN COMPOSITIONS

The present invention relates to one-can thermosetting resin compositions which are excellent in film properties and are especially good subsequent fabrication requiring high flexibility, particularly it relates to resin compositions usuful as a coating of steel plate e.g. precoat metal.

In general, a precoat metal is optionally shaped for ultimate use, after applying a coating to a metal plate such as galvanized steel, which is used for, for example, metal framing materials including light electrical appliances such as refrigerator, washing machine, electric stove, etc., as well as vending machines, business machines, food display cases, etc.

Such a precoat metal as above, as compared with the post-coating process in which, after a metal plate is shaped into a complicatedly shaped article, a coating is applied thereon, has such advantages as simplification of the post-coating process, uniform quality, saving the consumption of the coating, etc., and , therefore, enlargement of the field of use of such precoat metal is expected. The coating to be applied on such metal plate is required to keep extensibility as well as adhesion onto metal surface enough to be resistant to fabrication such as bending, rolling, embossing pressure, drawing, etc. On the other hand, for articles thus shaped are required adequate properties corresponding to the respective ultimate uses, for example, in the case of exterior building panel, a high weatherability and a strong corrosion-resistance covering also the fabricated parts, and, in the case of household electrical appliances such as refrigerator, scarring-resistance and stain resistance. Besides these properties, depending on uses, service durability such as gloss, water resistance, chemical resistance, moisture resistance, etc. is further required.

For such household electrical appliances mentioned above, have been used aminoalkyd resins, melamine-curing acrylic polyols or epoxy resins. These resins are poor in flexibility of the film, and they give rise to cracking on the coating films when bended at an angle of 90 degrees or more.

It has been a remarkably difficult problem to improve the properties of coating films while keeping good balance of processability on bending, stain resistance and chemical resistance. The object of the present invention lies in that resin composition providing excellent coating films having good balance of processability on bending, stain resistance and hardness and also excellent in other film properties.

The present inventor diligently carried out extensive research work for preparing resin compositions having excellent film properties and, as a result, found out that coating film having good processabilty on bending, superior hardness and also excellent chemical resistance as well as stain resistacne. Based on the above findings, was accomplsihed the present invention.

More specifically, the present invention relates to:

(1) a one-can thermosetting resin composition comprising (a) a polyester polyol which is obtainable by allowing dicarboxylic acid to react with glycol and polyol having at least three OH groups, either one of the dicarboxylic acid and the glycol being an aliphtic one and the other being a cyclic one, whose hydroxyl value is 20–300, and (b) a blocked a,a,a′,a′-tetramethyl-xylene diisocyanate or/and 4,4′-methylene bis (cyclohexyl isocynate) or a blocked NCO-terminated prepolymer which is obtained by allowing $\alpha,\alpha,\alpha',\alpha'$-tetramethyl-xylene diisocyanate or/and 4,4′-methylenebis(cyclohexyl isocyanate) to react with an active hydrogen compound, (2) a precoat metal, which has been prepared by coating a metal plate with the said composition, and heating the the coated metal plate to cure the coating material and (3) a process for preparing a precoat metal which comprises coating a metal plate with the said composition and heating the coated metal plate to cure the coating material.

The polyester polyol (a) to be used in the present invention is that obtained by allowing dicarboxylic acid to react with glycol and polyol having at least three OH groups, either one of the dicarboxylic acid and the glycol being an aliphatic one and the other being a cyclic one, particularly, an aromatic and/or alicyclic one, whose hydroxyl value is 20–300.

In the preparation of a polyester polyol to be employed in the present invention, when, as either one of dicarboxylic acid and glycol, an aliphatic one is used, a cyclic one, particularly, an aromatic and/or aliphatic one is used as the other. When the dicarboxylic acid is an aliphatic one, the glycol to be reacted with the dicarboxylic acid is a cyclic one, particularly an aromatic and/or alicyclic one, and, when the glycol is an aliphatic one, the dicarboxylic acid to be reacted with the glycol is a cyclic one, particularly, an aromatic and/or alicyclic one. When the dicarboxylic acid is an aliphatic one, it is exemplified by succinic acid, succinic anhydride, adipic acid, azelaic acid, sebacic acid, dodecanoic acid, maleic acid, maleic anhydride, fumaric acid, itaconic acid, dimeric acid, etc. As the cyclic glycol, particularly, aromatic and/or alicyclic glycol to be used in combination with such an acid as above, there are mentioned, for example, cyclohexanedimethanol, cyclohexanediol, xylylene glycol, bishydroxyethyl terephthalate, hydrogenated bisphenol A, etc. When the glycol is an aliphatic one, it is exemplified by ethylene glycol, diethylene glycol, propylene glycol, 1,3 butylene glycol, 1,4 butylene glycol, dipropylene glycol, 1,5 pentanediol, 1,6 hexanediol, neopentyl glycol, neopentyl glycol ester of hydroxypivalic acid, triethylene glycol, 1,9-nonanediol, 3-methyl-1,5 pentanediol, 2,2,4 trimethyl-1,3 pentandiol, 2-ethyl-1,3hexanediol, polycaprolactonediol, polypropyleneglycol, polytetramethylene ether glycol, polycarbonated diol, etc. The cyclic dicarboxylic acid, particularly, aromatic and/or alicyclic dicarboxylic acid to be used in combination with such a glycol as above is exemplified by phthalic acid, phthalic anhydride, isophthalic acid, isophthalic acid dimethyl ester, terephthalic acid, terephthalic acid dimethyl ester, 2,6 naphthalenedicarboxylic acid, hexahydrophathalic anhydride, cyclohexane dicarboxylic acid dimethyl ester, methyl hexahydrophthalic anhydride, 3,6-endomethylene-1,2,3,6-tetrahydro-cis-phthalic anhydride, methyl-3,6-endomethylene-1,2,3,6-tetrahydro-cis-phthalic anhydride, etc.

The polyol having at least three OH groups is exemplfied by glycerin, trimethylolpropane, trimethylolethane, 1,2,6-hexanetriol, pentaerythritol, diglycerin and,. besides, by ethylene oxide adducts, propylene oxide adducts or ϵ-caprolactone adducts prepared by using these polyols as initiators.

The polyester polyol (a) employed in the present invention is prepared by subjecting to esterification the afore-mentioned dicarboxylic acid, glycol and polyol having at least three OH groups.

The esterification is carried out by distilling off the condensate by a conventional means, and it is preferable to cease the reaction when the acid value of the product reaches 1–50, especially 2–20, for avoiding possible gelation due to the reaction when allowed to proceed too far.

An example of the esterification process, in a case of employing as the acid component an aliphatic or alicyclic dicarboxylic acid, comprises using the dicarboxylic acid in an excess molar ratio to the glycol used, and allowing the reaction to proceed until the acid value of the reaciton product reaches a given value by distilling off the condensation water while blowing nitrogen gas into the reaction vessel at 180°–260° C. to thereby obtain a polyester having COOH groups at both terminals. Then, a process is mentioned, which comprises adding to the above-obtained polyester a polyol having at least three OH groups, distilling off likewise the condensation water, and ceasing the reaction when the acid value of the product reaches not exceeding 50, preferably in the range of 2–20. On the other hand, in the case of employing as the acid component an aromatic dicarboxylic acid or its dimethyl ester, the acid component is used in a smaller molar ratio relative to the glycol used, the resulting condensate is distilled off under simialr conditions to the above to obtain a polyester having OH groups at both terminals, to which is then added dicarboxylic anhydride to cause ring-opening reaction to thereby obtain a polyester having COOH groups at both terminals. A further process to be mentioned comprises adding to the polyester a polyol having at least three OH groups and conducting reaction in a manner similar to the above to thereby obtain a polyester polyol.

Polyester polyols to be employed in the present invention are those having a hydroxyl value of 20–300, especially 30–250. Those having a hydroxyl value of less than 20 are poor in chemical resistance and stain resistance of the cured film of them. Those having a hydroxyl value of 300 or more are poor in bending resistance of the film.

In the present invention, when an aliphatic dicarboxylic acid is employed as one of the components for preparing a polyester polyol, a cyclic glycol, particularly, an aromatic and/or alicyclic glycol is employed as the other component, while, when an sliphatic glycol is employed as one of the components, a cyclic dicarboxylic acid, particularly, an aromatic or alicyclic dicarboxylic acid is employed as the other components. Other cominations than the above, for example, a combination of an aliphatic dicaboxylic acid and an aliphatic glycol is employed, then the resulting film is poor in chemical resistance and hardness even when a polyol is employed. And, when a combination of a cyclic dicarboxylic acid, particularly, an aromtic and/or alicyclic dicarboxylic acid and a cyclic glycol, particularly, an aromatic and/or alicyclic glycol is employed, the resulting film is extremely poor in bending resistance or adhesion.

As the blocked compound (b) to be employed in the present invention is mentioned a blocked a,a,a',a'-tetramethyl-xylene diisocyanate or/and 4,4'-methylene bis (cyclohexyl isocyanate) or a blocked NCO-terminated prepolymer obtainable by allowing α,α,α',α'-tetramethyl-xylylene diisocyanate (hereinafter abbreviated as TMXDI) or/and 4,4'-methylenebis(cyclohexyl isocyanate) (hereinafter abbreviated as $H_{12}MDI$) to react with an acitve hydrogen compound. TMXDI is exemplified by m-TMXDI, p-TMXDI and a mxiture of them. These have the following structural formula and are produced by the methods described for example in U.S. Pat. Nos. 3,290,350, 4,130,577 and 4,439,616.

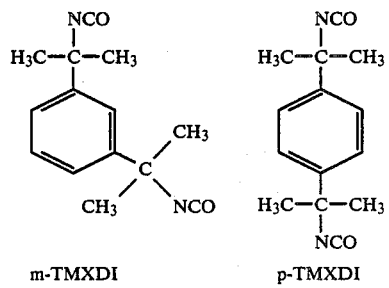

m-TMXDI p-TMXDI

The NCO-terminated prepolymer obtainable by allowing TMXDI or $H_{12}MDI$ to react with an active hydrogen compound can be obtained by using the isocyanate monomer to react with the active hydrogen compound under the conditions of excess isocyanate groups.

The active hydrogen compound employable for preparing this prepolymer is exemplified by a low-molecular-weight polyol, e.g. a divalent alcohol such as ethylene glycol, propylene glycol, 1,2-butylene glycol, 1,3-butylene glycol, 1,6-hexanediol, diethylene glycol, dipropylene glycol, neopentyl glycol, neopentyl glycol ester of hydroxy pivalic acid, triethylene glycol, hydrogenated bisphenol A, xylylene glycol, 1,4-butylene glycol, etc., a trivalent alcohol such as glycerin, trimethylol ethane, trimethylol propane, 1,2,6-hexanetriol, etc., a tetravalent alcohol such as pentaerythritol, etc.; polyether polyol such as propylene oxide or ethylene oxide adducts of the above-mentioned polyol; and a high-molecular-weight polyol such as polyester polyol obtainable by allowing the above-mentioned low-molecular-weight polyol to react with dicarboxylic acid or that modified with oil fatty acid.

These polyols may be used alone or as a mixture.

The prepolymer can be preapred by conducting the reaction with the ratio of NCO/OH within the range of about 2.0–15, preferably about 4–8, generally at 40°–140° C., preferably at 70°–100° C., followed by, upon necessity, removing unreacted isocyanate monomer by means of conventional thin-film distillation or extraction. This reaction may be carried out in the presence of an organometallic catalyst such as tin-, lead-, zinc-or iron-type one. The prepolymer is exemplified by biuret compounds obtainable by allowing an excess of the above-mentioned isocyanate monomer to react with water or a lower amine such as ethylenediamine; allophanate compounds obtainable by allowing an excess isocyanate monomer to react with the above-mentioned low-molecular-weight polyol or high-molecular weight polyol; and further by dimers or trimers obtainable by subjecting an isocyanate monomer to reaction by using a known catalyst for dimerization or trimerization of an organic diisocyanate.

The afore-mentioned blocked isocyanate monomers or blocked prepolymers thereof can be obtained by allowing an isocyanate monomer or a prepolymer thereof to react with a blocking agent by a conventional process.

As the blocking agent, use may be made of any of blocking agents known to be employable for the blocking of isocyanates such as those based on phenol, lactam, active methylene, alcohol, mercaptan, acid amide, imide, amine, imidazole, urea, carbamic acid salt, imine, oxime and sulfite. Among them, the blocking agents based on phenol, oxime, lactam and imine are advantageously employed. As specific examples of the blocking agent, there may be mentioned the following:

Blocking agents based on phenol:
Phenol, cresol, xylenol, nitrophenol, chlorophenol, ethylphenol, p-hydroxydiphenyl, t-butylphenol, o-isopropylphenol, o-sec-butylphenol, p-nonylphenol, p-t-octylphenol, hydroxybenzoic acid, hdyroxybenzoic acid ester, etc.

Blocking agents beased on lactam:
$\epsilon$-Caprolactam, $\delta$-valerolactam, $\gamma$-butyrolactam, $\beta$-propiolactam, etc.

Blocking agents based on active methylene:
Diethyl malonate, dimethyl malonate, ethyl acetoacetate, methyl acetoacetate, acetylacetone, etc.

Blocking agents based on alcohol:
Methanol, ethanol, n-propyl alcohol, isopropyl alcohol, n-butyl alcohol, isobutyl alcohol, t-butyl alcohol, n-amyl alcohol, t-amyl alcohol, lauryl alcohol, ethylene glycol monomethyl ether, ethylene glycol monoethyl ether, ethylene glycol monobutyl ether, diethylene glycol momethyl ether, diethylene glycol monoethyl ether, propylene glycol monomethyl ether, benzyl alcohol, methoxymethanol, glycolic acid, glycolates such as methyl glycolate, ethyl glycolate and butyl glycolate, lactic acid, lactic acid esters such as methyl lactate, ethyl lactate and butyl lactate, methylolurea, methylolmelamine, diacetone alcohol, ethylene chlorohydrin, ethylene bromohydrin, 1,3-dichloro-2-propanol, $\omega$-hydroperfluoroalcohol, acetone cyanohydrin, etc.

Blocking agent based on mercaptan:
Butylmercaptan, hexylmercaptan, t-butylmercaptan, t-dodecylmercaptan, 2-mercaptobenzothiazole, thiophenol, methylthiophenol, ethylthiophenol, etc.

Blocking agents based on acid amide:
Acetanilide, acetanisidide, acetotoluide, acrylamide, methacrylamide, acetamide, stearic acid amide, benzamide, etc.

Blocking agent based on imide:
Succinimide, phthalimide, maleimide, etc.

Blocking agents based on amine:
Diphenylamine, phenylnaphthylamine, xylidine, N-phenylxylidine, carbazole, aniline, naphthylamine, butylamine, dibutylamine, butylphenylamine, etc.

Blocking agents based on imidazole:
Imidazole, 2-ethylimidazole, etc.

Blocking agents based on urea:
Urea, thiourea, ethylene urea, ethylene thiourea, 1,3-diphenyl urea, etc.

Blocking agents based on carbamate:
Phenyl N-phenylcarbamate, 2-oxazolidone, etc.

Blocking agent based on imine:
Ethyleneimine, propyleneimine, etc.

Blocking agents based on oxime:
Formamidoxime, acetaldoxime, acetoxime, methyl ethyl ketoxime, diacetylmonoxime, benzophenoneoxime, cyclohexanoneoxime, etc.

Blocking agents based on sulfite:
Sodium bisulfite, potassium bisulfite, etc.

As the procedures of conducting the above-mentioned reaction between an isocyanate monomer or a prepolymer thereof and a blocking agent, use is made of, for example, a procedure of reacting an isocyanate monomer or its prepolymer with a blocking agent at an NCO/active hydrogen groups in the blocking agent equivalent ratio of about 0.9 to 1.0, preferably about 0.95–1.0; a procedure which comprises reacting an isocyanate monomer to react with a blocking agent at an NCO/active hydrogen groups in the blocking agent equivalent ratio of about 1.1–3.0, preferably about 1.2–2.0, followed by reacting further with such low-molecular-weight polyol, high-molecualr-weight polyol, water or lower amine as usable in the above-mentioned prepolymer; or a procedure which consists of reacting an isocyanate monomer with a low-molecular-weight polyol, high-molecular-weight polyol, water or lower amine at an NCO/active hydrogen equivalent ratio of about 1.5–10.0, preferably about 2.0–7.0, followed by reacting further with a blocking agent.

Each of the above-mentioned reactions is carried out by a conventional procedure in the presence or absence of a solvent not having active hydrogen (e.g. esters such as ethyl acetate and butyl acetate, ketones such as acetone, methyl ethyl ketone and methyl isobutyl ketone, ethers such as tetrahydrofuran, and the like). In conducting the reaction, a known catalyst such as tertiary amine and organometallic compound may be used.

Among the above-mentioned blocked materials, TMXDI or its prepolymer is preferably used to give a film of good stain-resistance.

The one can thermosetting resin composition is a composition containing the above-mentioned polyester polyol (a) and blocked material (b).

The ratio of the above-mentioned component (1) and (2) is about 2/1–1/2, especially preferably about 1/0.8–1/1.2, in terms of OH/regenerated isocyanate groups equivalent ratio.

While the composition of the present invention can be used itself as clear coatings or adhesives, it may be supplemented, in addition to the above-mentioned components (a) and (b), depending upon necessity, with an organic solvent such as esters, e.g. ethyl acetate, butyl acetate, methyl acetoacetate, 2-ethoxyethyl acetate, etc., aromatic solvents, e.g. xylene, toluene, etc., ketones, e.g. methyl ethyl ketone, methyl isobutyl ketone, cyclohexanone, etc., and ethers, e.g. diethylene glycol dimethyl ether; coloring pigments or extenders, dispersants of such type as silicon-, amine-, polyether-, polyester-, castor oil-, synthetic wax- or bentonite-; an antiforming agent; a levelling agent; a thioxotropic agent; a stabilizer of such type as benzotriazol-, hindered amine- or hindered phenol-; a catalyst of such type as tin-, lead-, zinc- or iron-; etc.

The one-can thermosetting resin composition of the present invention obtained thus above is applied onto a substrate, which is then subjected to heating to thereby dissociate the blocking agent contained in (b) to regenerate NCO groups, and these regenerated NCO groups react with OH groups in (a) to give a cured film.

The resin composition of the present invention is used as coatings or adhesives, and it is advantageously used for preparing precoated metals.

The metal plate usable for preparation of precoated metals, normally, may be any one employed for precoated metal, which is exemplified by aluminium, tin-free steel, zinc-plated steel and iron, and those subjected to chemical surface treatment such as phosphating process are preferred.

Shape and form of metal plates may be either flatplate shaped or cylindrical. On these metal plates is applied the resin composition of the present invention, preferably to give a thickness of about 15 μ to 25 μ of cured film.

As examples of the means of application, there may be mentioned spray-gun, roll coater, flow coater, etc.

Thus coated metal plates are heated for curing.

The heating temperature varies with the kinds of blocking agents and is about 150°-350° C., while the heating time is preferably in the range of about 20-120 seconds. Through such heating procedure, the blocking agent in the blocked material (b) dissociate to regenerate NCO groups, and thus regenerated NCO groups react with OH groups in (a) to cause crosslinking, yielding tough coating films.

The cured films thus obtained as above are completely freed of yellowing and thermal degradation, and also exhibit increased hardness as well as a high flexibility, stain resistance and chemical resistance. Especially, when the resin composition of the present invention is used for preparing precoated metals, it gives good steel plates, thus being advantageously utilized for, among others, light electrical appliances.

The present invention is more specifically illustrated by the following Examples. In the Examples, parts or % means parts by weight or weight %, respectively.

EXAMPLE 1

A reaction vessel was charged with 288.7 parts of cyclohexane dimethanol and 809.0 parts of sebacic acid. The mixture was heated at 220° C., and allowed to undergo reaction, while blowing a nitrogen gas to distill off water resulting form condensation. When the reaction mixture showed an acid value of 230.0, 404.5 parts of trimethylol propane was added thereto. The mixture was likewise allowed to undergo reaction, while distilling off water resulting from condensation, to thereby obtain a polyester polyol with an acid value of 3.5 and a hydroxyl value of 197.3. The polyester polyol was dissolved in cyclohexanone to a solution with a solid content of 40%. On the other hand, a reaction vessel was charged with 976 parts of m-TMXDI, 44.7 parts of trimethylol propane (hereinafter abbreviated as TMP) and 0.05 part of dibutyltindilaurate, followed by heating at 80°-85° C. for 4 hours under stirring in nitrogen streams to give a urethane compound. Completion of the reaction was confirmed by means of amine equivalent method, then the reaction mixture was cooled.

In the next step, the excess m-TMXDI was removed by means of thin film distillation at a wall-surface temperature of 150°-155° C. under reduced pressure of 0.1-0.2 mmHg to give 235 parts of m-TMXDI-TMP prepolymer whose isocyanate group content was 3.3%. This prepolymer was dissolved in 451.6 parts of ethyl acetate in a reaction vessel. To the solution was added 0.1 part of 1,1,3,3-tetra n-butyl-1,3-diacetoxydistannoxane, to which was added dropwise gradually 66.0 parts of methyl ethyl ketoxime under the atmosphere of nitrogen gas while keeping the reaction temperature at 60° C., followed by keeping the same temperature for three hours to give a solution with a solids content of 60%, which contained 6.22% of regenerated isocyanate groups, whose Gardner viscosity was P-Q/25° C.

A mixture of 54.7 parts of the above-mentioned polyester polyol, 35.4 parts of titanium oxide (Tipaque CR-90; Ishihara Sangyo Kaisha Ltd.) and 10.0 parts of cyclohexanone was sufficiently kneaded to give a white enamel whose hydroxyl equivalent was 1300. With 50.0 parts of this white enamel were mixed 0.015 part of 1,1,3,3-tetra-n-butyl-1,3-diacetoxydistannoxane, 0.13 part of a levelling agent (BYK-300 ®; BYK-Mallinckrodt, Inc.) and 26.0 parts of the above-mentioned blocked product. The mixture was applied on 0.8 mm thick, surface-treated galvanized iron plate to a dried coating film thickness of 20 μ, which was then baked in the atmosphere at 260° C. for 60 seconds, thereby yielding a glossy white coating film. The properties of the coating film are shown in Table 1.

EXAMPLE 2

A reaction vessel was charged with 410.9 parts of bishydroxyethyl terephthalate and 647.7 parts of sebacic acid. The mixture was heated at 220° C., and allowed to undergo reaction, while blowing a nitrogen gas to distill off water resulting from condensation. When the reaction mixture showed an acid value of 184.4, 323.6 parts of TMP was added thereto. The mixture was then allowed to undergo reaction, while distilling off water resulting from condensation, to thereby obtain a polyester polyol with an acid value of 8.0 and a hydroxyl value of 168.3. This polyol was dissolved in cyclohexanone to a solution with a solids content of 40%.

A mixture of 52.1 parts of this polyester polyol solution, 30.8 parts of titanium oxide (Tipaque CR-90; Ishihara Sangyo Kaisha Ltd.) and 17.1 parts of cyclohexanone was sufficiently kneaded by means of a paint conditioner to give a white enamel with a hydroxyl equivalent of 1600. With 50.0 parts of this white enamel were mixed 0.015 part of 1,3,3-tetra-n-butyl-1,3-diacetodistannoxane, 0.13 part of BYK-300 and 21.1 parts of the solution of blocked product obtained in Example 1. The mixture was applied on 0.8 mm thick, surface-treated galvanized iron plate to a dried coating film thickness of 20μ, which was then baked in the atmosphere of 260° C. for 60 seconds, thereby yielding a glossy white coating film. The properties of the coating film are shown in Table 1.

EXAMPLE 3

A mixture of 54.7 parts of the solution of polyester polyol obtained in Example 1, 31.9 parts of titanium oxide and 13.4 parts of cyclohexanone was sufficiently kneaded by means of a paint conditioner, thereby yielding a white enamel with a hydroxyl equivalent of 1300. On the other hand, 241.9 parts of m-TMXDI was dissolved in 165.8 parts of Solvesso-100. To the solution was added dropwise 143.8 parts of methyl ethyl ketoxime over a period of one hour, followed by heating further at 75°-80° C. for one hour.

Then, 0.7 part of 1,1,3,3-tetra-n-butyl-1,3-diacetoxystannoxane and 205.3 parts of an oil-modified polyester polyol (a resin obtained by conventional condensation of 444 parts of phthalic anhydride, 200 parts of coconut oil fatty acid, 152 parts of propylene glycol and 268 parts of TMP was dissolved to a 70% solution in butyl acetate having an acid value of 3.0 and a hydroxyl value of 113.0) solution were added, and the reaction was allowed to proceed at 75°-80° C. for 4 hours, thereby yielding a solution of blocked product in which the content of regenerated isocyanate group was 8.69% and the content of solid portion was 70%.

With 50.0 parts of the above-mentioned white enamel were blended 0.015 part of 1,1,3,3-tetra-n-butyl-1,3-diacetoxydistannoxane, 0.13 part of BYK-300 and 18.6 parts of the above-mentioned solution of blocked product. The mixture was applied on 0.8 mm thick, surface-treated galvanized iron plate to a dried coating film thickness of 20 $\mu$, which was then baked in the atmosphere at 260° C. for 60 seconds, thereby yielding a glossy white coating film.

The properties of the coating film are shown in Table 1.

EXAMPLE 4

In 309.6 parts of Solvesso-150 was dissolved 262.4 parts of $H_{12}MDI$. To the solution was added dropwise 109.0 parts of methyl ethyl ketoxime over a period of one hour, followed by heating further at 60° C. for 2 hours. To the resultant were added 0.8 part of 1,1,3,3-tetra-n-butyl-1,3-diacetoxydistannoxane and 372.3 parts of an oil-modified polyester polyol (the same compound as employed in Example 3) solution, and the reaction was allowed to proceed at 75°-80° C. for 4 hours, thereby yielding a solution of blocked product in which the content of regenerated isocyanate group was 5.0% and the content of solid portion was 60%. By means of a paint conditioner were sufficiently kneaded 52.1 parts of polyester polyol obtained in Example 2, 35.0 parts of titanium oxide and 13.0 parts of cyclohexanone to give a white enamel with a hydroxyl equivalent of 1600. With 50.0 parts of this white enamel were blended 0.015 part of 1,1,3,3-tetra-n-butyl-1,3-diacetoxydistannoxane, 0.13 part of BYK-300 and 26.3 parts of the above-mentioned solution of blocked product. The mixture was applied on 0.8 mm thick, surface-treated galvanized iron plate to a dried coating film thickness of 20$\mu$, which was then baked in the atmosphere of 260° C. for 60 seconds, thereby yielding a glossy white coating film. The properties of the coating film are shown in Table 1.

REFERENCE EXAMPLE 1

A reaction vessel was charged with 376.8 parts of cyclohexane dimethanol and 216.0 parts of isophthalic acid. The mixture was heated at 220° C., and allowed to undergo reaction, while blowing a nitrogen gas to distill off water resulting from condensation. When the reaction mixture showed an acid value of 3.0, 400.8 parts of hexahydrophthalic anhydride was added thereto. After the reaction temperature reached 170° C., the reaction was allowed to proceed for one hour to thereby obtain a COOH-terminated ester with an acid value of 160.1. To this ester were added 262.9 parts of TMP and 0.1 part of dibutyltin dilaurate. The mixture was likewise allowed to undergo reaction, while distilling off water resulting from condensation to thereby obtain a polyester polyol with an acid value of 9.0 and a hydroxyl value of 152.0. This polyol was dissolved in cyclohexanone to a solution with a solid content of 40%. By means of a paint conditioner were sufficiently kneaded 54.3 parts of this polyester polyol solution, 30.4 parts of titanium oxide and 15.4 parts of cyclohexanone, thereby yielding a white enamel with a hydroxyl equivalent of 1700.

With 50.0 parts of this white enamel were blended 0.015 part of 1,1,3,3-tetra-n-butyl-1,3-diacetoxydistannoxane, 0.13 part of BYK-300 and 19.9 parts of the solution of blocked product obtained in Example 1. The mixture was applied on 0.8 mm thick, surface-treated galvanized iron plate to a dried coating film thickness of 20$\mu$, which was then baked in the atmosphere of 260° C. for 60 seconds, thereby yielding a glossy white coating film. The properties of the coating film are shown in Table 1.

REFERENCE EXAMPLE 2

A mixture of 581.5 parts of isophthalic acid, 707.9 parts of sebacic acid, 624.9 parts of neopentyl glycol and 124.1 parts of ethylene glycol was heated at 220° C., and allowed to undergo reaction, while blowing a nitrogen gas to distill off water resulting from the reaction, thereby yielding a polyester polyol with an acid value of 2.4 and a hydroxyl value of 55. This polyol was dissolved in mixture of xylene and cyclohexanone (1:1) to a solution with a solid content of 40%.

By means of a paint conditioner were sufficiently kneaded 72.9 parts of this polyester polyol solution and 27.1 parts of titanium oxide, thereby yielding a while enamel with a hydroxyl equivalent of 3500. With 50.0 parts of this white enamel were blended 0.01 part of 1,1,3,3-tetra-n-butyl-1,3-diacetoxydistannoxane, 0.13 part of BYK-300 and 9.6 parts of the solution of blocked product of Example 1. The mixture was applied on 0.8 mm thick, surface-treated galvanized iron plate to a dried coating film thickness of 20$\mu$, which was then baked in the atmosphere of 260° C. for 60 seconds, thereby yielding a glossy white coating film. The properties of the coating film are shown in Table 1.

EXAMPLE 5

A reaction vessel was charged with 264.7 parts of 3-methyl-1,5-pentanediol, 116.7 parts of diethylene glycol and 332.3 parts of isophthalic acid. The mixture was heated at 220° C., and allowed to undergo reaction, while blowing a nitrogen gas to distill off water resulting from the reaction. When the reaction mixture showed an acid value of 8.0, 296.2 parts of phthalic anhydride was added thereto. After the reaction temperature reached 160° C., the reaction was allowed to proceed for one hour to thereby obtain a COOH-terminated ester with an acid value of 142.4. To this ester were added 202.3 parts of TMP and 0.1 part of dibutyltindilaurate, and the mixture was then likewise allowed to undergo reaction, while distilling off water resulting from condensation, thereby yielding a polyester polyol with an acid value of 9.0 and a hydroxyl value of 140.0. This polyol was dissolved in cyclohexanone to a solution with a solid content of 40%.

By means of a paint conditioner were sufficiently kneaded 55.7 parts of this polyester polyol solution, 29.9 parts of titanium oxide and 14.5 parts of cyclohexanone to thereby obtain a white enamel with a hydroxyl equivalent of 1800.

With 50.0 parts of this white enamel were blended 0.015 part of 1,1,3,3-tetra-n-butyl-1,3-diacetoxydistannoxane, 0.13 part of BYK-300 and 18.8 parts of the solution of blocked product obtained in Example 1. The mixture was applied on 0.8 mm thick, surface-treated galvanized iron plate to a dried coating film thickness of 20$\mu$, which was then baked in the atmosphere of 260° C. for 60 seconds, thereby yielding a glossy white coating film. The properties of the coating film are shown in Table 1.

EXAMPLE 6

A reaction vessel was charged with 379.4 parts of 1,6-hexane diol and 332.3 parts of isophthalic acid. The mixture was heated at 220° C., and allowed to undergo reaction, while blowing a nitrogen gas to distill off water resulting from the condensation. When the reaction mixture showed an acid value of 6.0, 308.3 parts of hexahydrophthalic anhydride was added thereto. After the reaction temperature reached 170° C., the reaction was allowed to proceed for one hour to thereby obtain a COOH-terminated ester with an acid value of 130.5, to which were further added 202.3 parts of TMP and 0.1 part of dibutyltindilaurate. The mixture was allowed to undergo reaction, while distilling off likewise water resulting from the condensation, to obtain a polyester polyol with an acid value of 10.2 and a hydroxyl value of 122.0. This polyol was dissolved in cyclohexanone to a solution with a solid content of 40%.

By means of a paint conditioner were sufficiently kneaded 57.5 part of this polyester polyol solution, 28.8 parts of titanium oxide and 13.7 parts of cyclohexanone to thereby yield a while enamel with a hydroxyl equivalent of 2000. With 50.0 parts of this white enamel were blended 0.015 part of 1,1,3,3-tetra-n-butyl-1,3-diacetoxydistannoxane, 0.13 part of BYK-300 and 16.9 parts of the solution of blocked product obtained in Example 1. The mixture was applied on 0.8 mm thick, surface-treated galvanized iron plate to a dried coating film thickness of 20μ, which was then baked in the atmosphere of 260° C. for 60 seconds, thereby yielding a glossy white coating film. The properties of the coating film are shown in Table 1.

xylene diisocyanate or/and 4,4'-methylene bis (cyclohexyl isocyanate) or a blocked NCO-terminated prepolymer which is obtained by allowing a,a,a',a'-tetramethyl-xylene diisocyanate or/and 4,4'-methylene bis (cyclohexyl isocyanat) to react with an active hydrogen compound.

2. The composition as claimed in claim 1, wherein the polyester polyol (a) is one obtained by the reaction of sebacic acid, cyclohexane dimethanol and trimethylol propane and the blocked NCO-terminated prepolymer (b) is one obtained by the reaction of α,α,α',α',-tetamethyl-m-xylene diisocyanate-trimethlolpropane prepolymer with methyl ethyl ketoxime.

3. The composition as claimed in claim 1, wherein the polyester polyol (a) is one obtained by the reaction of sebacic acid, bis-hydroxyethyl terephthalate and trimethylolpropane and the blocked NCO-terminated prepolymer (b) is one obtained by the reaction of α,α-,α',α'-tetramethyl-m-xylene diisocyanate-trimethylolpropane prepolymer with methyl ethyl ketoxime.

4. A precoat metal, which has been prepared by coating a metal plate with a compositin comprising (a) a polyester polyol which is obtainable by allowing dicarboxylic acid to react with a glycol and a polyol haing at least three OH groups, either one of the dicarboxylic acid and the glycol being an aliphatic one and the other being a cyclic one, whose hydroxyl value is 20–300, and (b) a blocked a,a,a',a'-tetramethyl-xylene diisocyanate

TABLE 1

| | Example 1 | Example 2 | Example 3 | Example 4 | Example 5 | Example 6 | Reference Example 1 | Reference Example 2 |
|---|---|---|---|---|---|---|---|---|
| Pencil hardness (marking method*1) | 3H | 2H | 2H | 2H | 2H | 3H | 3H | B |
| T-bending | | | | | | | | |
| (20° C.*2) | 3T | 2T | 2T | 1T | 2T | 3T | 9T | 0T |
| (60° C.) | 0T | 0T | 0T | 0T | 0T | 0T | 5T | 0T |
| Solvent tolerance xylene rubbing*3 (do) | 60 | 55 | 45 | 45 | 50 | 45 | 35 | 2 |
| Stain resistance*4 Felt Pen: | | | | | | | | |
| Black | ⊚ | ⊚~○ | ⊚~○ | ⊚~○ | ⊚ | ⊚~○ | ○~△ | X |
| Red | ○ | ○ | ○ | ○ | ○ | ○ | △ | X |

Evaluation Method:
*1Pencil hardness: The lead of a pencil is well sharpened, and the pencil is vertically set on the coating film. With a load of 1 kg, the pencil is moved horizontally on the surface of the film. The result is expressed in the hardness of the pencil which left no marking on the film surface.
*2T-bending: With one or more iron sheets of the same thickness as the testpiece sandwiched, each testpiece is bent through 180 degrees under a pressure of 50 kgG/cm² applied with a hand-press at the bend is macroscopically examined. The T-bending is shown in terms of the minimum number of the iron sheets causing no cracks in the testpiece.
*3Solvent tolerance: A textile swab impregnated with xylene is reciprocated in contact with coated surface of the testpiece with a constant force. The result is expressed in the number of reciprocations till loss of the surface gloss.
*4Stain resistance: With a felt pen is drawn lines on the surface of the test film, which is left standing for 24 hours. The lines are wiped with a wad of sanitary cotton saturated with ethanol. The trace of the lines is examined for evaluation.
⊚ no trace
○ slightly traced
△ traced to some extent
X apparent trace

What is claimed is:

1. A one-can thermosetting resin composition comprising (a) a polyester polyol which is obtainable by allowing dicarboxylic acid to react with a glycol and a polyol having at least three OH groups, either by one of the dicarboxylic acid and the glycol being an aliphatic one and the other being a cyclic one, whose hydroxyl value is 20–300, and (b) a blocked a,a,a',a'-tetramethyl- or/and 4,4'-methylene bis (cyclohexyl isocyanate) or a blocked NCO-terminated prepolymer which is obtained by allowing a,a,a',a'-tetramethyl-xylene diisocyanate or/and 4,4'-methylene bis (cyclohexyl isocyanate) to react with an active hydrogen compound, and heating the coated metal plate to cure the coating material.

5. The precoat metal as claimed in claim 4, wherein the polyester polyol (a) is one obtained by the reaction of sebacic acid, cyclohexane dimethanol and trimethylol propane and the blocked NCO-terminated prepolymer (b) is one obtained by the reaction of α,α,α',α'-tetramethyl-m-diisocyanate-trimethylolpropane prepolymer with methyl ethyl ketoxime.

6. The precoat metal as claimed in claim 4, wherein the polyester polyol (a) is one obtained by the reaction of sebacic acid, bis-hydroxyethyl terephthalate and trimethylolpropane and the blocked NCO-terminated prepolymer (b) is one obtained by the reaction of α,α,α',α'-tetramethyl-m diisocyanate-trimethylolpropane prepolymer with methyl ethyl ketoxime.

7. A process for preparing a precoat metal which comprises coating a metal plate with a composition comprising (a) a polyester polyol which is obtainable by allowing dicarboxylic acid to react with glycol and a polyol having at least three OH groups, either one of the dicarboxylic acid and the glycol being an aliphatic one and the other being a cyclic one, whose hydroxyl value is 20–300, and (b) a blocked a,a,a', a'-tetramethyl-xylene diisocyanate or/and 4,4'-methylene bis (cyclohexyl isocyanate) or a blocked NCO-terminated prepolymer which is obtained by allowing a,a,a',a'-tetramethyl-xylene diisocyanate or/and 4,4'-methylene bis (cyclohexyl isocyanate) to react with an active hydrogen compound, and heating the coated metal plate to cure the coating material.

8. The process as claimed in claim 7, wherein the heating temperature is about 150°–350° C. and the heating time is in the range of about 20–120 seconds.

* * * * *